Feb. 24, 1925.
H. L. UNLAND
1,527,761
ELECTRIC STEAM GENERATOR
Filed Dec. 16, 1922
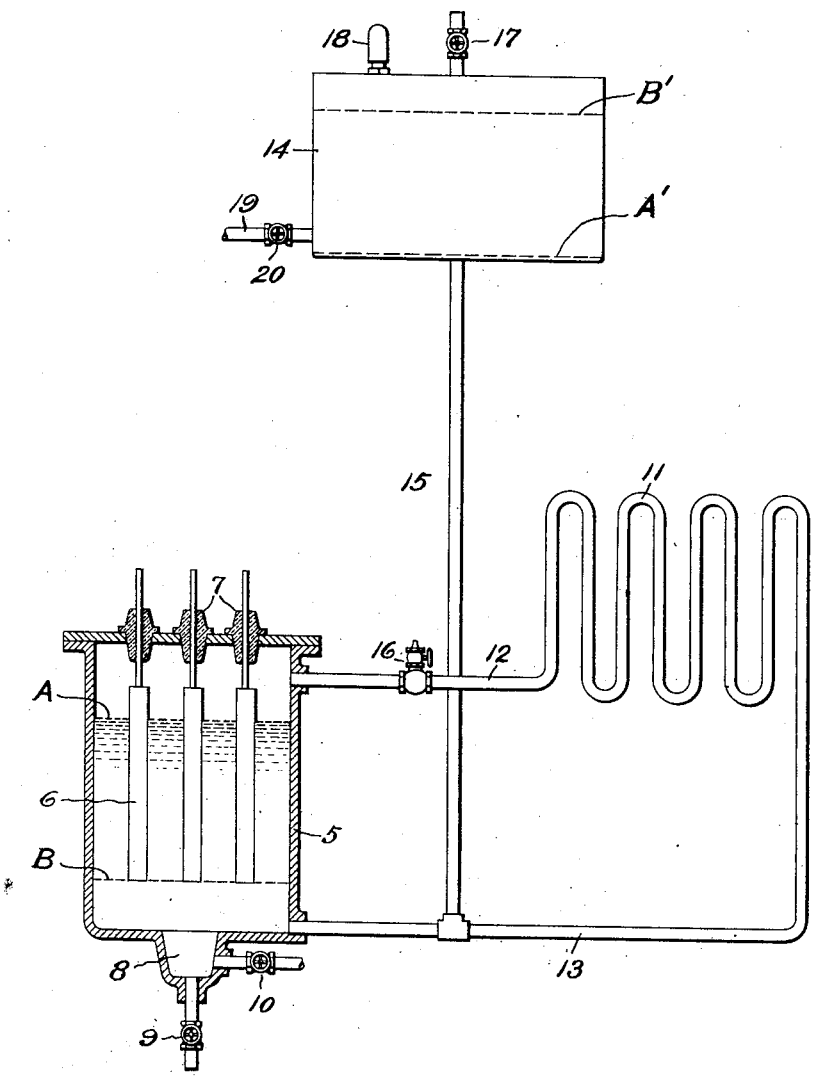
Inventor:
Harry L. Unland,
by
His Attorney.

Patented Feb. 24, 1925.

1,527,761

UNITED STATES PATENT OFFICE.

HARRY L. UNLAND, OF SCHENECTADY, NEW YORK, ASSIGNOR TO GENERAL ELECTRIC COMPANY, A CORPORATION OF NEW YORK.

ELECTRIC STEAM GENERATOR.

Application filed December 16, 1922. Serial No. 607,267.

*To all whom it may concern:*

Be it known that I, HARRY L. UNLAND, a citizen of the United States, residing at Schenectady, county of Schenectady, State of New York, have invented certain new and useful Improvements in Electric Steam Generators, of which the following is a specification.

The present invention relates to steam generators or boilers of the electrode type wherein steam is generated by passing alternating current through water, and has for its object to provide an improved regulating means for such generators.

For a consideration of what I believe to be novel and my invention, attention is directed to the accompanying description and claims appended thereto.

In the drawing the figure is a diagramatic view partly in section of a steam generator provided with a regulating means embodying my invention.

Referring to the drawing, 5 indicates the shell of an electric generator or boiler and 6 the electrodes which project into the shell through suitable insulators 7. The electrodes may be connected to any suitable source of alternating current. In the present instance three electrodes are shown which adapts the generator or boiler for connection to a three-phase alternating current. At the bottom of the shell is a sump 8 provided with a blow-off valve 9, and also if desired, with an extraction valve 10 for drawing off hot water. This arrangement of steam generator or boiler is shown only by way of example and is to be taken as typical of any suitable generator structure. At 11 is indicated consumption means for steam, such as for example, a heating coil, steam being conveyed to it by a pipe 12 and condensate being conveyed from it back to the generator by conduit 13. This forms a closed system.

Now, according to my invention, I provide a storage and regulating tank 14 located a desired distance above shell 5 and connect it to the generator at a point below the water level at which the electrodes just touch the water. In the present instance tank 14 is shown as being connected to the boiler shell by a pipe 15, which connects to conduit 13. In a generator of this type the power input will vary with the extent to which the electrodes are submerged—i. e. with the level of the water in shell 5. The water level A indicated in the drawing may be taken to indicate full load water level and the water level B, no load water level. These are the operating limits of the water level in the generator. Tank 14 has a capacity slightly greater than that represented by the volume of shell 5 between the full load and no load levels and is placed at a level above shell 5 to give a desired pressure head for the generator. With full load water level A in shell 5 the water level in tank 14 is at A' and with no load water level B in shell 5 the water level in tank 14 is at B'.

With full load water level A in the generator the pressure in the generator will be equal to the head represented by the distance between levels A and A'. If the steam pressure increases above said value the water level in shell 5 will be forced downward due to the increased pressure and the water level in tank 14 will be raised. The lowering of the water level in shell 5 decreases the amount which the electrodes are submerged and hence the input of the generator. The maximum pressure which can occur in the generator is one equal to the head represented by the difference in level between B and B'. By giving tank 14 a suitable shape and a capacity slightly greater than the capacity of shell 5 between levels A and B, and by placing it at a suitable height above casing 5 the system can be made to give any desired value of maximum pressure within reasonable limits.

At 16 is a suitable air relief valve to be used to let the air out of the system when starting. For ordinary low pressure operation the upper end of tank 14 is open to atmosphere through a valve 17. If it is desired to employ a maximum pressure in the steam generator greater than that which can be obtained economically by the use of a water column, I may accomplish this by providing on the storage tank a spring-loaded or safety type valve which will only open after a certain maximum pressure in tank 14 is reached. In the present instance I have indicated such a valve at 18. It may be of any suitable type and is preferably adjustable so it may be made to open at any desired pressure. To put valve 18 into service it is only necessary to close valve 17.

Connected to tank 14 is a feed water conduit 19 provided with a valve 20, which is used to supply make-up water to the system.

My invention is particularly well adapted for use with closed steam systems wherein the steam after condensation is returned to the generator, and in the drawing such a system is illustrated. The use of my invention results in a very simple regulating means requiring no moving parts or special controlling or governing means. At the same time it is reliable in operation.

While I have specifically described my invention as used to generate steam from water, this being the ordinary application, it will of course be understood that it may be used to generate vapor from any liquid desired.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The combination with a vapor generator of the electrode type wherein vapor is generated by the passage of electric current between electrodes and the input is regulated by varying the depth to which the electrodes are submerged, of means whereby such depth is varied in accordance with the pressure in the generator, said means comprising a storage tank located above the generator and a conduit connecting it to the generator below the liquid level therein.

2. The combination with a vapor generator of the electrode type wherein vapor is generated by the passage of electric current between electrodes and the input is regulated by varying the depth to which the electrodes are submerged, of a closed consumption system connected to said generator, a tank located above the generator, and a conduit connecting the tank to the generator below the lower ends of the electrodes, whereby as the pressure in the generator varies the depth to which the electrodes are submerged will be varied to regulate the generator by the passage of liquid to and from the tank.

3. In an electric boiler of the electrode type wherein vapor is generated by the passage of electric current between electrodes and the input is regulated by varying the depth to which the electrodes are submerged, the combination of a boiler shell, electrodes depending into it, a closed circulating system having one side connected to the shell above the liquid level therein and the other side connected to the lower end of the shell, a tank located above the shell, and a conduit connecting it to the shell below the liquid level in the shell whereby when the pressure generated in the boiler increases liquid may be forced from the shell into the tank to vary the depth to which the electrodes are submerged.

In witness whereof, I have hereunto set my hand this 14th day of December, 1922.

HARRY L. UNLAND.